(12) United States Patent
Brandstrom

(10) Patent No.: US 8,757,086 B2
(45) Date of Patent: Jun. 24, 2014

(54) CLADDING THE INTERIOR OF A STRAIGHT PIPE SECTION

(76) Inventor: Randel Brandstrom, Edmonton (CA)

( * ) Notice: Subject to any disclaimer, the term of this patent is extended or adjusted under 35 U.S.C. 154(b) by 915 days.

(21) Appl. No.: 12/845,296

(22) Filed: Jul. 28, 2010

(65) Prior Publication Data

US 2012/0024824 A1 Feb. 2, 2012

(51) Int. Cl.
B05C 7/02 (2006.01)
B23K 9/04 (2006.01)
B05B 3/00 (2006.01)
B05B 7/06 (2006.01)

(52) U.S. Cl.
USPC ........... 118/306; 118/317; 118/318; 118/321; 118/323; 118/316

(58) Field of Classification Search
CPC ................................... B23K 9/04; B05C 7/02
USPC ......... 118/302, 306, 317, 318, 313–315, 321, 118/323; 219/76.1, 76.14, 76.16, 125.11, 219/121.47, 121.48; 427/230, 231, 233, 427/427.1, 427.3, 427.5
See application file for complete search history.

(56) References Cited

U.S. PATENT DOCUMENTS

| | | | | |
|---|---|---|---|---|
| 2,124,853 | A * | 7/1938 | Grupe | 72/47 |
| 2,451,635 | A * | 10/1948 | Schratt | 451/83 |
| 2,943,001 | A * | 6/1960 | Socke | 427/235 |
| 4,323,750 | A | 4/1982 | Marmorat | |
| 4,515,832 | A * | 5/1985 | Roeder et al. | 427/233 |
| 4,866,241 | A | 9/1989 | Doherty | |
| 4,952,769 | A | 8/1990 | Acheson | |
| 7,335,264 | B2 * | 2/2008 | Motherwell et al. | 118/317 |
| 8,061,296 | B1 * | 11/2011 | Batur | 118/318 |
| 2008/0073328 | A1 * | 3/2008 | Kossowan | 219/76.14 |

* cited by examiner

Primary Examiner — Yewebdar Tadesse
(74) Attorney, Agent, or Firm — Adrian D. Battison; Ade & Company Inc

(57) ABSTRACT

The interior of a straight pipe is clad using a plurality of welding heads. The pipe is carried on support rollers including drive components for rotating the pipe about its axis while holding it fixed against axial movement. There are four welding heads with two carried on a cantilevered support arm of a respective one of a first and a second carriage mounted outside the pipe at opposite ends of the pipe and each movable in a direction longitudinally of the axis of the pipe. The heads are located on the arm at a common angular position at bottom dead center to weld vertically downwardly. The pipe support includes a pair of drive rollers arranged with their axes parallel to the axis of the pipe and adjustable in spacing to change the height of the pipe on the rollers relative to the welding heads.

12 Claims, 7 Drawing Sheets

CLADDING THE INTERIOR OF A STRAIGHT PIPE SECTION

This invention relates to an apparatus for cladding the interior of a straight pipe section.

BACKGROUND OF THE INVENTION

The cladding of the interior of pipes by a hard surfacing material such as weld is common to reduce wear and to provide longer life.

Examples are shown in the following US patents:

U.S. Pat. No. 4,866,241 (Doherty) assigned to Union Carbide and issued Sep. 12, 1989 which discloses apparatus for coating the internal surface of a pipe having an irregular internal surface which comprises a combination of three arms which enable a torch for spraying plasma to be in the optimal coating position as it moves over and coats the internal surface. Movement and rotation of the spray nozzle are controlled as the object is rotated about its longitudinal axis such that the central spray axis is maintained substantially perpendicular to the internal surface, the distance between the spray nozzle and the impingement point is maintained substantially constant, and the rate at which the impingement point moves over the internal surface is maintained substantially constant.

U.S. Pat. No. 4,323,750 (Marmorat) assigned to Framatome and issued Apr. 6, 1982 which discloses an installation for lining a tubular member such as a pipe having a diameter of the order of 650 to 1,000 mm, particularly in the nuclear industry. The pipe is placed with its axis horizontal on a support which enables it to be rotated about its axis. The lining installation comprises a vertical welding head which is mounted on the end of a horizontal arm, the position of which is adjustable to introduce the welding head into the pipe. The elongate lining material is supplied to the welding head by a feed device comprising a reel on which the lining material is wound, and which is arranged at the front of the welding head. The reel is mounted so as to rotate on an axle fixed relative to the end of the arm and whose axis forms a small angle with the axis of the arm. The device also comprises adjustable means for guiding the lining material from a low part of the reel to an upper part of the welding head.

U.S. Pat. No. 4,952,769 (Acheson) issued Aug. 28, 1990 which discloses an apparatus for weld build-up on a surface of revolution consisting of an elongated, rotatable assembly that supports, at one end, an electrical welding torch terminating in a nozzle, the rotatable assembly introduction electrical welding current, inert gas, and welding wire to the torch, and including an electrically conductive, hollow, metal drive spindle. The drive spindle applies driving motion and conducts electrical current for transmission to the torch, and the gas and welding wire pass through the spindle to the torch. Also, an electrically conductive carrier is mounted in a radially adjustable, electrically continuous, offset relationship to a conductive body joined to the end of a spindle, and a torch held is in electrically conductive relationship by the carrier.

SUMMARY OF THE INVENTION

It is one object of the invention to provide an apparatus for cladding the interior of a straight pipe section.

According to one aspect of the invention there is provided an apparatus for cladding the interior of a straight pipe section comprising:

a support for the pipe including drive components for rotating the pipe about its axis;

a first and a second carriage mounted outside the pipe at opposite ends of the pipe and each movable in a direction longitudinally of the axis of the pipe;

each carriage carrying a cantilever arm mounted on the carriage and arranged so as to extend axially of the pipe into the interior of the pipe so that movement of the carriage acts to move the arm along the pipe;

each cantilever arm carrying at least one coating head for applying a coating bead to an interior surface of the pipe as the carriage is moved.

The material applied by the coating head can be welding wire, welding rod or can be PTA plasma transfer arc. In all cases the electric arc used generates heat to apply the components from the welding material or from a metal powder which is dropped into the arc.

Preferably the carriages are arranged to move simultaneously in the same longitudinal direction. However they can move in opposite directions to balance forces relative to the supports. The carriages are preferably linked by electrical control to the drive systems rather than mechanically.

Preferably the head or the outermost one of a series of heads is mounted on the arm at a position so that movement of the respective carriage carries the head to a position at a mid-point of the pipe. In this way the heads operate to clad the pipe to the mid point position with one carriage operating on one half and the other carriage operating on the other half.

Preferably each arm carries at least two heads where the heads are spaced along the arm longitudinally of the arm. In this way there are four heads, the cladding process operates at four times the speed of a system having only one head. In this arrangement, preferably the heads on the arm are located at a common angular position round the arm and particularly at the bottom dead center so that the welding head acts vertically downwardly which provides most effective control over the weld bead as it moves downwardly under gravity.

Preferably there are two heads on each arm so that they are spaced by a distance equal to one quarter of the length of the pipe, however more than two heads can be used at symmetrically spaced positions.

Preferably the pipe is held against axial movement on the support. However an alternative system may use movement of the pipe itself relative to the carriages to effect the required relative movement.

Many different configurations of the applied bead can be used in the pipe depending on the relative movement of the pipe and the head where the pipe is rotated on the support as the carriages are moved. This can apply the coating bead in a helical path where the rotation is arranged to be 360 degrees as the head moves along its full length of operation so that each head is arranged to form one turn of helix on the interior of the pipe. However the beads may be applied in a stepped index arrangement where the bead extends axially and the pipe only rotated in steps at the end of each stroke of movement of the carriages. Alternatively the bead can extend generally circumferentially and the stepping takes place axially Preferably each carriage includes a guide track on which the carriage moves with the guide tracks located underneath the pipe for accurate control of the path of movement of the carriages. The guide tracks preferably include two transversely spaced track members one of which provides a flat top surface and the other of which provides an apex for locating the carriage side to side on the guide track. In this way the movement of the carriages is held at a predetermined accurate location relative to the axis of the pipe and the cantilever arm holds the welding heads at an accurate location relative to the carriages. For this purpose preferably the carriage includes a frame supporting the arm to hold the arm at fixed location relative to the axis of the pipe.

Preferably the welding head is mounted on the arm by an adjustment device for moving the head radially of the arm so as to adjust a distance of the head from the inner surface of the pipe, bearing in mind that the pipe may not be accurately circular in cross section.

Preferably the height of the pipe on the support is adjustable so as to move the heads on the carriages relative to the inner surface of the pipe. This adjustment, and/or the adjustment of the head in the carriage can be used to adjust for out of round pipes or for different pipe diameters. In addition these adjustments can be used to accommodate pipes of stepped diameter so that the pipe axis is raised or lowered so that the inner surface of the pipe is kept at a constant distance from the heads as the inner surface changes in diameter. In this case, depending on the length of the pipe and the location of the step, one of the two heads on each carriage may be removed or deactivated as the one remaining is operating on the step.

In order to change the height of the pipe on the support, preferably the support includes a pair of drive rollers arranged with their axes parallel and parallel to the axis of the pipe and the pair of drive rollers are arranged to be adjusted in spacing to change the height of the pipe on the rollers.

According to a second aspect of the invention there is provided an apparatus for cladding the interior of a straight pipe section comprising:

a support for the pipe;

a first and a second carriage mounted outside the pipe at opposite ends of the pipe;

the carriages and the pipe being mounted for relative movement in a direction longitudinally of the axis of the pipe;

each carriage carrying a cantilever arm mounted on the carriage and arranged so as to extend axially of the pipe into the interior of the pipe so that movement of the carriage acts to move the arm along the pipe;

each cantilever arm carrying at least one coating head for applying a coating bead to an interior surface of the pipe as the carriage is moved;

wherein each arm carries at least two coating heads where the coating heads are spaced along the arm longitudinally of the arm.

According to a third aspect of the invention there is provided an apparatus for cladding the interior of a straight pipe section comprising:

a support for the pipe;

a first and a second carriage mounted outside the pipe at opposite ends of the pipe;

the carriages and the pipe being mounted for relative movement in a direction longitudinally of the axis of the pipe;

each carriage carrying a cantilever arm mounted on the carriage and arranged so as to extend axially of the pipe into the interior of the pipe so that movement of the carriage acts to move the arm along the pipe;

each cantilever arm carrying at least one coating head for applying a coating bead to an interior surface of the pipe as the carriage is moved;

wherein the carriage includes a frame supporting the arm to hold the arm at fixed location relative to the axis of the pipe;

and wherein the height of the pipe on the support is adjustable so as to move the coating heads on the carriages relative to the inner surface of the pipe.

While the term "pipe" is used herein, this is not intended to limit or imply any limitation in respect of the function of the component to be coated. Thus the apparatus can be used in respect of any cylindrical body having a straight axis, as opposed to elbows or other curved bodies. The pipe concerned may have a constant diameter along its length or may be stepped at one or more locations so that the diameter changes.

This apparatus described herein is used for the hard surfacing of straight pipe (usually 40 ft long) of varying diameters (10" to 48").

The main concept consists of two welding carts on either side of the pipe. Welding is performed by accessing the pipe from both ends. The two carts are synchronized and are mechanically and or electrically interconnected. They are each moved into the pipe without any support or fixturing on the inside of the pipe. The pipe rotates but does not move axially.

On each of the carts two welding heads are mounted on a cantilevered beam that requires no internal support while penetrating up to 20 ft into the pipe. In this way, four welding heads (two on each cart) are used simultaneously to increase productivity. Thus the cantilevered beam does not require any supports.

A set of pivoting dual wheels is used for driving the cart in and out, one side is centered on V-groove track, and the other side is flat.

Torch height and pipe height control is achieved both at the weld head itself (individual control for each head) and by adjusting the spacing on the pipe rotation rollers. Thus torch height control for each individual torch is done right at the head.

Welding is performed in a spiral meaning the pipe is rotated as the carts gradually drive into the pipe and weld.

Access from both ends of the pipe allows for smaller travelling distances and a shorter cantilever leading to less alignment issues.

The use of a dual wheel system on a pivot or walking beam provides proper alignment. One side of the cart is on a V-groove, for centering purposes, the other side is riding on flat wheels.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
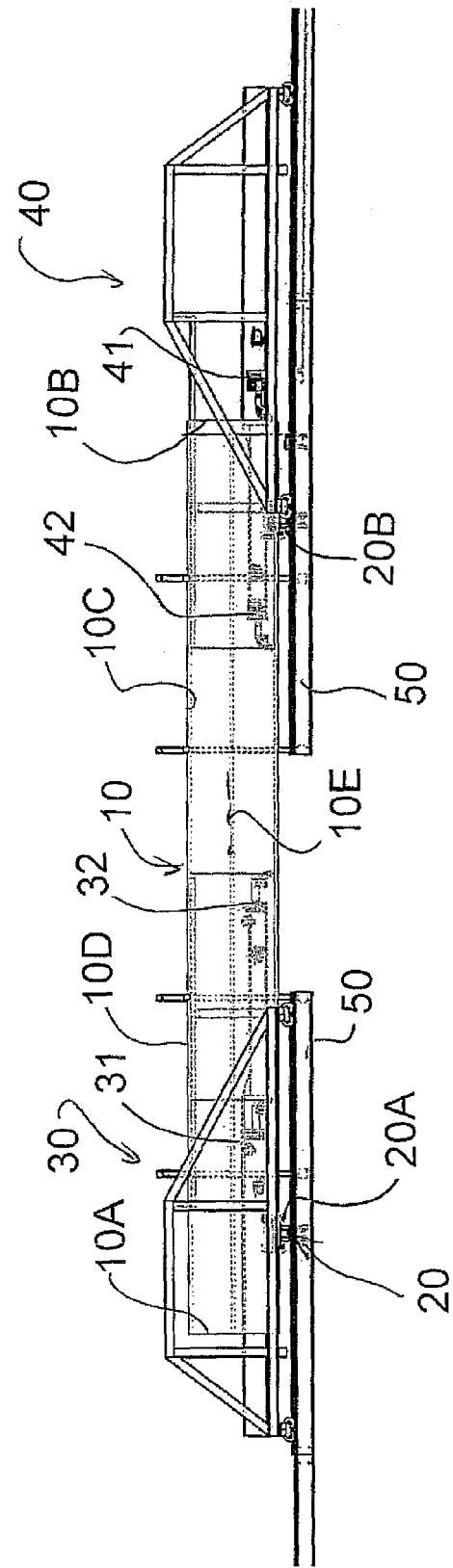
FIG. 1 is a side elevational view of one embodiment of an apparatus for cladding the interior of a straight pipe section according to the present invention, showing the carts in an initial position with one fully extended into the pipe and the other cart partly extended.
Figure 2:
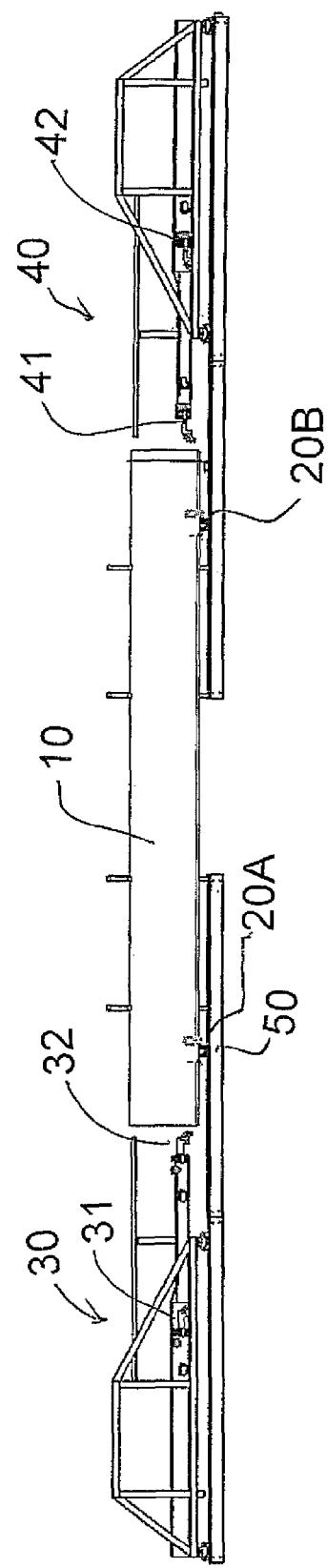
FIG. 2 is a side elevational view of the embodiment of FIG. 1 showing both carts fully withdrawn from the pipe.
Figure 3:
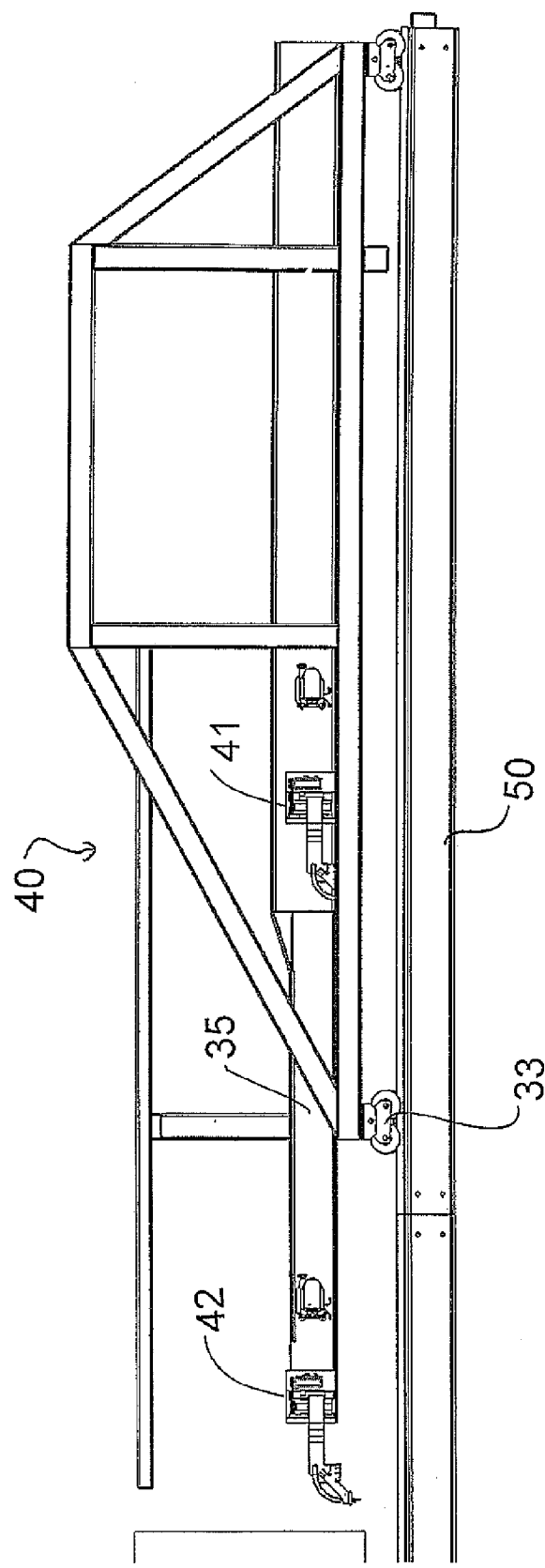
FIG. 3 is a side elevational view of the embodiment of FIG. 1 showing one cart on an enlarged scale.
Figure 4:
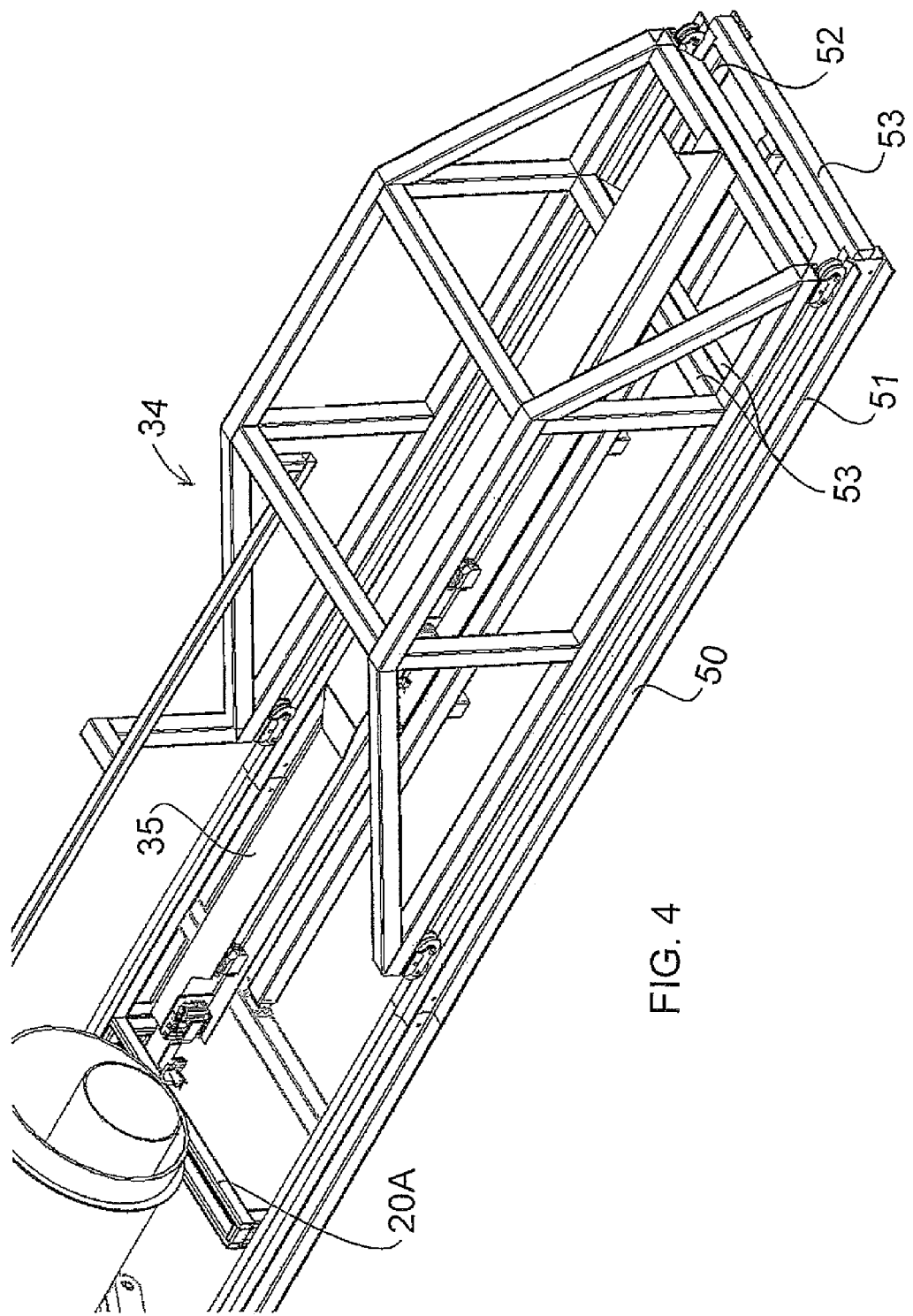
FIG. 4 is an isometric view of the cart of FIG. 3.
Figure 5:
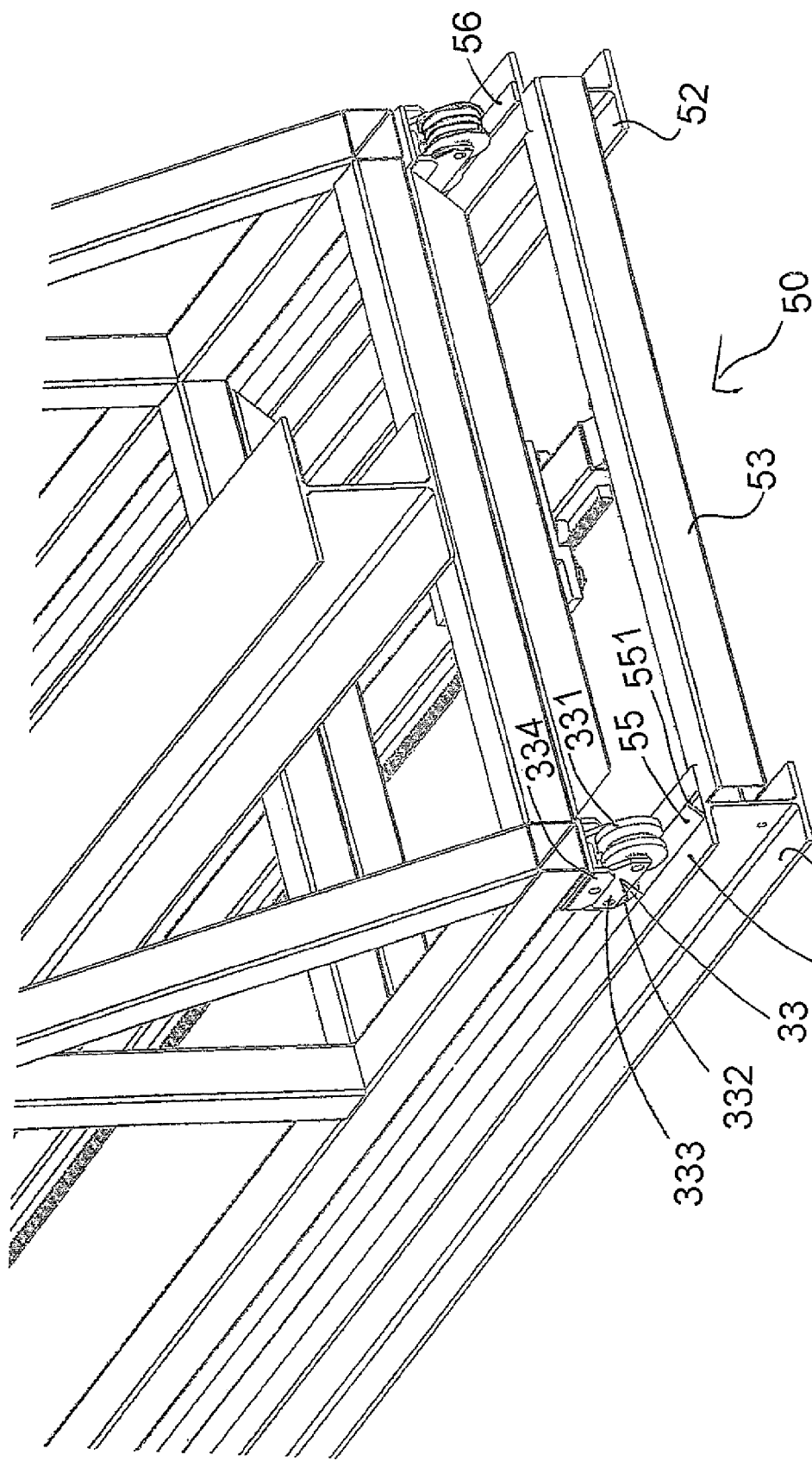
FIG. 5 is an isometric view on an enlarged scale of the cart of FIG. 3 showing the guide track.

An apparatus is provided for cladding the interior of a pipe section 10 having ends 10A and 10B, an inner surface 100 to be clad and an outer surface 10D. The pipe has a longitudinal axis 10E which is straight so that the outer surface 10D is typically a cylinder of constant cross section and diameter. However the pipe to be coated may be of a stepped arrangement having sections of different diameter (not shown). The pipe may include end flanges or end sections which allow coupling of the end of one pipe to the end of the next but these are not shown and generally do not affect the shape of the inner surface The apparatus includes a support 20 for the pipe including two axially spaced support sections 20A and 20B for supporting the pipe adjacent its ends.

The apparatus further includes two carriages 30 and 40 for supporting welding heads 31 and 32 on the carriage 30 and welding heads 41 and 42 on the carriage 40 for operation inside the pipe on the inner surface 100 of the pipe to provide the required cladding on the surface.

Each carriage 30, 40 is mounted on a respective support and guide track 50 defined by a pair of rails 51 and 52 connected and held at parallel spaced positions by cross members 53. The rails are arranged to be carried on a suitable support surface in the location where the cladding is to be effected. Each of the rails forms an I-beam having a top surface 54 on which is mounted a guide track 55, 56. Each of the carriages has runners 33 for rolling on the respective guide track. Each runner includes a pair of rollers 331 and 332 carried on a pivotal beam 333 pivotally attached to a bracket 334 on the underside of the carriage. The beam allows the rollers to rise and fall to accommodate any undulations in the guide tracks. The guide tracks are located underneath the pipe and include the two transversely spaced track members 55 and 56 one of which 56 provides a flat top surface formed by a strip of metal attached to the top surface 54 and the other of which 55 is defined by an inverted angle which provides an apex 551 for locating the carriage side to side on the guide track. The rollers running on the track 55 form a groove in the rolling surface and the rollers running on the track 56 form a flat surface for receiving the flat surface of the track. In this way the runners are guided accurately and held accurately in side to side position without competing guide elements potentially causing binding.

Figure 7:
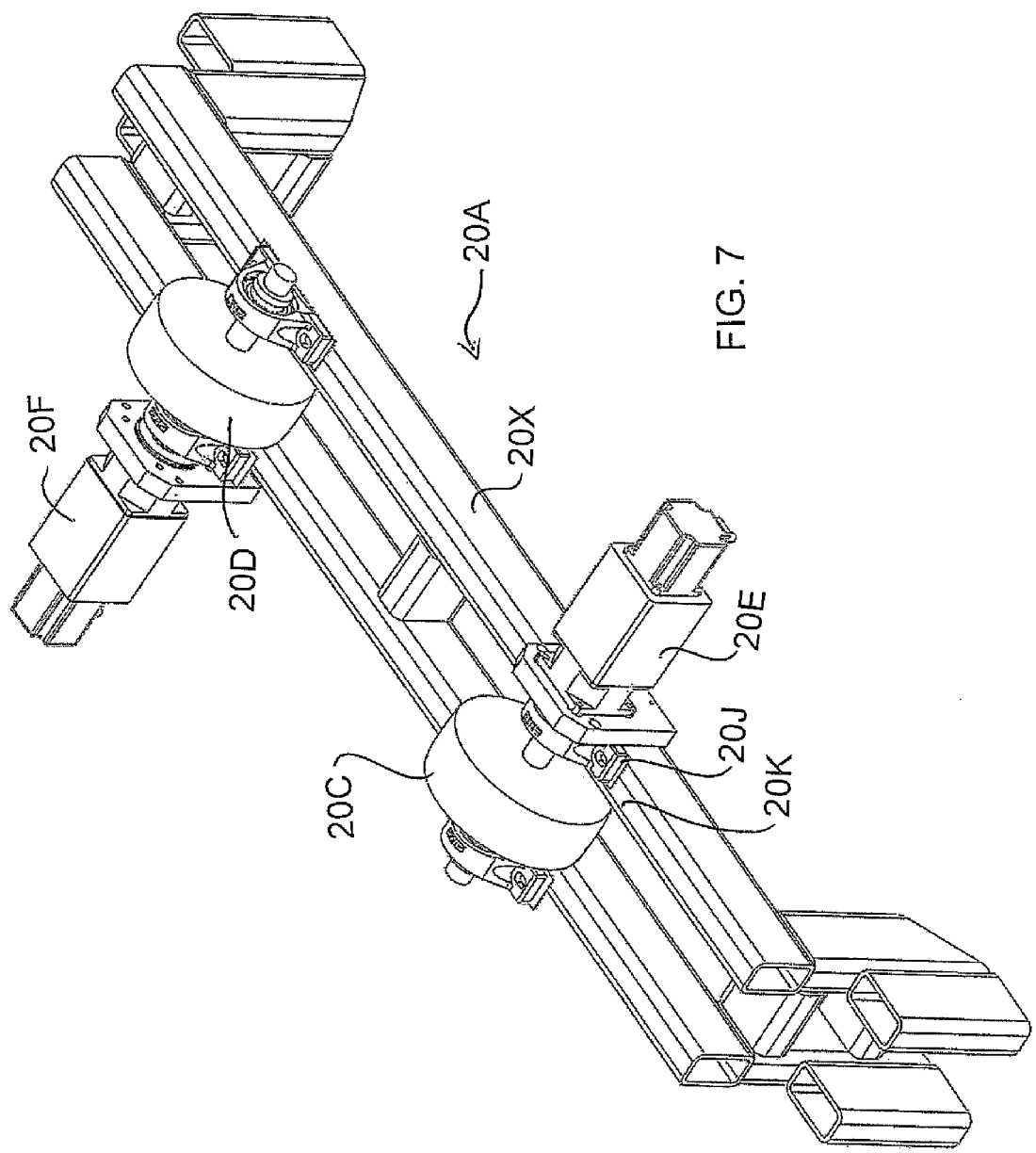
FIG. 7 is an isometric view on an enlarged scale of apparatus of FIG. 1 showing one of the sets of pipe support rollers.

The pipe is carried on the supports 20A and 20B, one of which is shown in FIG. 7. The supports act to hold the pipe against axial movement on the support by frictional engagement with the pipe. The support 20A includes a cross beam 20X carried on a respective one of the guide tracks and underlying the pipe and extending across the pipe. The beam 20B carries a pair of drive rollers 20C and 20D with their axes parallel to the axis of the pipe at positions spaced across the underside of the pipe so as to cradle the outside surface of the pipe. The rollers are driven by digitally controlled motors 20E and 20F so that the pipe can be rotated about its axis through controlled angular movement obtained by controlled driving rotation of the rollers. The drive rollers are carried on supports 20J movable on slides 20K along the beam 20X so that the drive rollers are adjusted in spacing to change the height of the axis of the pipe on the rollers. In this way, the height of the pipe on the support is adjustable so as to move the position of the heads 31, 32, 41 and 42 on the carriages relative to the inner surface of the pipe.

Each of the first and second carriage 30, 40 is mounted on the guide track outside the pipe at opposite ends of the pipe and each is movable along its guide track in a direction longitudinally of the axis of the pipe.

Each carriage includes a structural frame 34 which provides a rigid support for a cantilever arm 35 mounted on the carriage and arranged so as to extend axially of the pipe into the interior of the pipe. Thus movement of the carriage along the track acts to move the arm 35 along the pipe.

Each cantilever arm carrying at least one welding head for applying a welding bead to an interior surface of the pipe as the carriage is moved.

Figure 6:
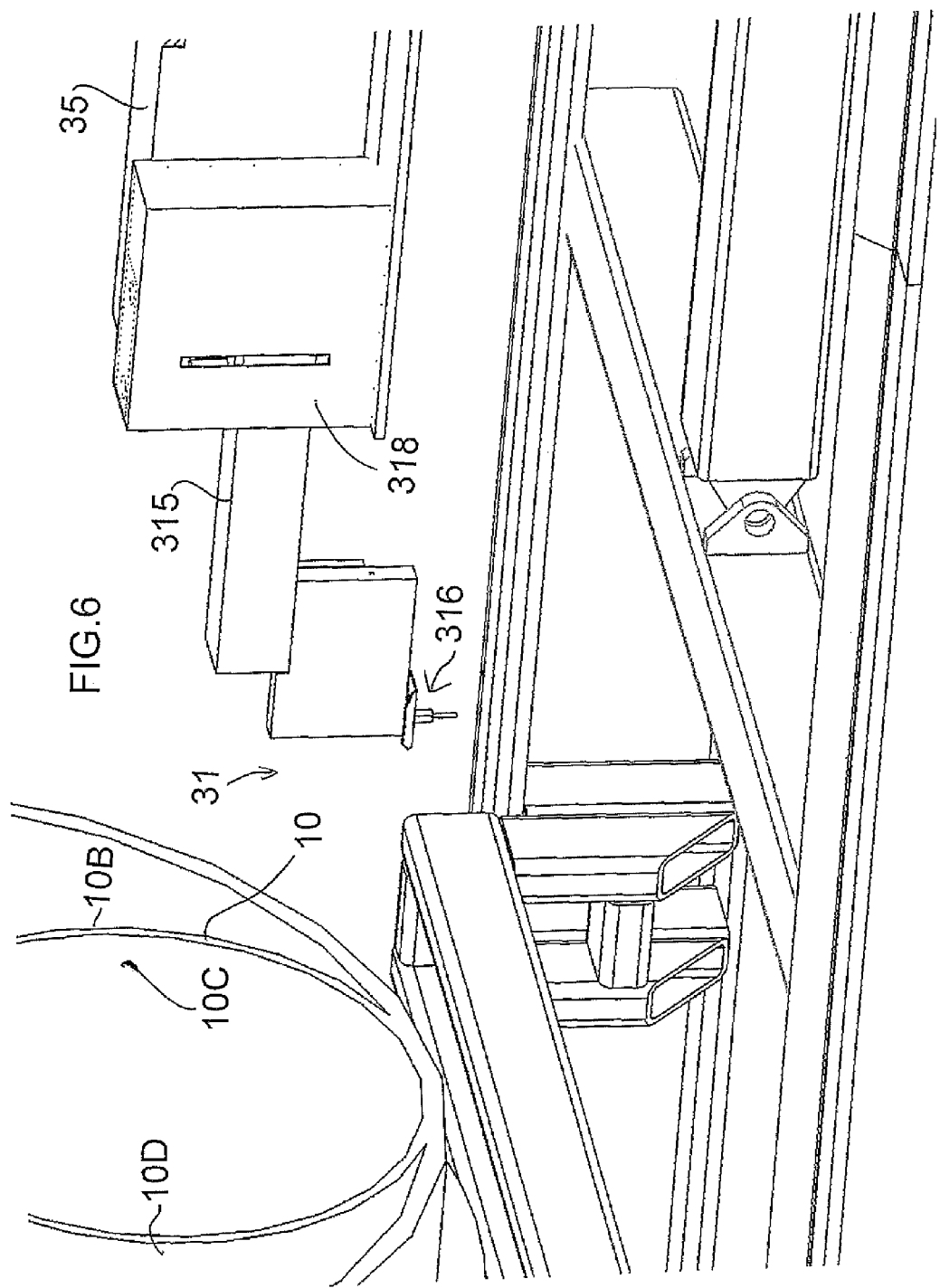
FIG. 6 is an isometric view on an enlarged scale of the cart of FIG. 3 showing one welding head.

As shown in FIG. 6, the head 31 includes a mounting strap 315 which is mounted on a vertical adjustment device 318 of a construction that will be apparent to one skilled in the art which may be defined by two parallel slide shafts and a linear actuator or may be a pivotal arrangement. The strap 315 extends forwardly from the mounting on the arm 35 to a forward end where a conventional electrical welding head 316 is carried. The head 316 includes a supply of the weld wire. The height adjustment of the strap 315 on the arm 35 arm by the adjustment device acts to move the head vertically, that is, radially of the arm, so as to adjust a distance of the head 316 from the inner surface 10C of the pipe.

In operation, commencing at a start position shown in FIG. 1, the carriages are located so that the carriage 30 is fully inserted so that the head 32 is at a mid point and the head 31 is at a position ¼ of the distance into the pipe from the end 10k The carriage 40 is partly inserted so that the head 42 is at the ¼ position from the end 10B and the head 41 is directly at the end 10B. The carriages are arranged to move simultaneously in the same longitudinal direction so that the carriage 30 is moved in a retraction direction and the carriage 40 is inserted. Thus the head 42 is mounted on the arm 35 of the carriage 40 at a position so that movement of the respective carriage carries the head 42 to a position at a mid-point of the pipe while the head 41 moves to the ¼ position and the head 32 is retracted to the ¼ position and the head 31 is moved to the end 10A. The heads on the arm are all located at a common angular position around the arm, that is, each is located at the bottom dead center so that the welding head 316 acts vertically downwardly.

As the carriages are moved through the required distance equal to ¼ of the length of the pipe of typically 10 feet, the pipe can be rotated on the support so as to apply the weld bead in the required path. When the carriage are moved to the position described above, the movement is reversed and the carriages moved in a further weld applying stroke to take up the original position of FIG. 1.

Welding action can occur in one direction of movement of the carriages or in both directions as required.

The number of heads can be varied depending on the length and construction of the pipe. Higher production rates can be obtained by increasing the number of heads to two or a higher number.

After the welding is complete, the carriages are retracted in opposite directions to remove all heads for the pipe to allow it to be removed from the support 20.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus for cladding an interior surface of a straight pipe comprising:
   a support for the pipe arranged to hold a longitudinal axis of the pipe horizontal;
   the support including drive components for rotating the pipe about the longitudinal axis;
   a first and a second carriage mounted outside the pipe at opposite ends of the pipe and each movable in a direction longitudinally of the longitudinal axis of the pipe;

each carriage carrying a respective one of first and second cantilever arms each mounted on the respective carriage and arranged so as to extend axially of the pipe into the interior of the pipe so that longitudinal movement of the respective carriage acts to move the respective arm along the pipe;

each cantilever arm carrying at least one weld bead coating head for applying a weld bead at a predetermined angular and axial position on the to an interior surface of the pipe;

such that the interior surface of the pipe is coated by moving the carriages longitudinally and by rotating the pipe as the carriages are moved;

the first and second carriages being arranged to move the first and second weld bead coating heads respectively from an end of the pipe only to a position at or adjacent a mid-point of the pipe so that each of the first and second weld bead coating head acts to coat only a part of the length of the pipe.

2. The apparatus according to claim 1 wherein the carriages are arranged to move simultaneously in the same longitudinal direction with the weld bead coating heads maintained spaced longitudinally the pipe.

3. The apparatus according to claim 1 wherein the first and second weld bead coating heads are mounted on the first and second arms respectively at a position so that movement of the first carriage carries the first weld bead coating head from a first end of the pipe to a position at a mid-point of the pipe while the second carriage carries the second weld bead coating head from the position at a mid-point of the pipe to a second end of the pipe.

4. The apparatus according to claim 1 wherein each of the first and second arms carries at least two coating heads spaced along the arm longitudinally of the arm.

5. The apparatus according to claim 4 wherein said at least two coating heads are located at the same angular position relative to the longitudinal axis of the pipe.

6. The apparatus according to claim 5 wherein said at least two coating heads are located at the bottom dead center relative to the axis of the pipe so that the coating heads apply the weld bead vertically downwardly.

7. The apparatus according to claim 4 wherein each of the first and second arms carries two coating heads spaced by a distance equal to one quarter of the length of the pipe.

8. The apparatus according to claim 1 wherein each carriage includes a guide track on which the carriage moves with the guide tracks located underneath the pipe.

9. The apparatus according to claim 8 wherein the guide tracks include two transversely spaced track members one of which provides a flat top surface and the other of which provides an apex for locating the carriage side to side on the guide track.

10. The apparatus according to claim 1 wherein said at least one weld bead coating head is mounted on the respective arm by an adjustment device for moving said at least one weld bead coating head radially of the respective arm so as to adjust a distance of said at least one weld bead coating head from the interior inner surface of the pipe.

11. The apparatus according to claim 1 wherein the height of the pipe on the support is adjustable so as to move said at least one weld bead coating head relative to the interior surface of the pipe.

12. The apparatus according to claim 1 wherein the support includes a pair of drive rollers arranged with their axes parallel to each other and parallel to the axis of the pipe and wherein the drive rollers are arranged to be adjusted in spacing to change the height of the pipe on the rollers.

* * * * *